United States Patent [19]

Lamonde

[11] Patent Number: 5,305,078
[45] Date of Patent: Apr. 19, 1994

[54] MEASUREMENT OF ATTENUATION OF OPTICAL FIBERS USING TRANSMITTED WAVELENGTH AND POWER INFORMATION

[75] Inventor: Joseph E. G. Lamonde, St. Nicolas, Canada

[73] Assignee: EXFO Electro-optical Engineering Inc., Vanier, Canada

[21] Appl. No.: 822,785

[22] Filed: Jan. 21, 1992

[51] Int. Cl.$^5$ .................................. G01N 21/59
[52] U.S. Cl. ................................. 356/73.1
[58] Field of Search .................. 356/73.1, 408

[56] References Cited

U.S. PATENT DOCUMENTS

| | | | |
|---|---|---|---|
| 4,234,253 | 11/1980 | Higginbotham et al. | 356/73.1 |
| 4,673,291 | 6/1987 | Heckmann | 356/73.1 |
| 4,726,676 | 2/1988 | Maslaney et al. | 356/73.1 |
| 4,737,026 | 4/1988 | Dalgoutte et al. | 356/73.1 |
| 4,737,027 | 4/1988 | Maeda | 356/73.1 |
| 4,799,790 | 1/1989 | Tsukamoto et al. | 356/73.1 |
| 4,901,003 | 2/1990 | Clegg | 324/66 |

Primary Examiner—Vincent P. McGraw

[57] ABSTRACT

Attenuation of an optical fiber is measured by transmitting an optical signal having a predetermined wavelength to the fiber, and FSK modulating the optical signal with information identifying the wavelength and transmitted power of the optical signal. At a receiver, the optical signal is detected and the information is recovered by demodulation. Wavelength-dependent sensitivity information for the detector is read from a store in dependence upon the wavelength information and used to control the gain of an amplifier for amplifying a subsequently transmitted continuous wave optical signal used for attenuation measurement. The received power level of this optical signal is converted into a digital value and used with the transmitted power information to determine the fiber attenuation at the predetermined wavelength.

6 Claims, 1 Drawing Sheet

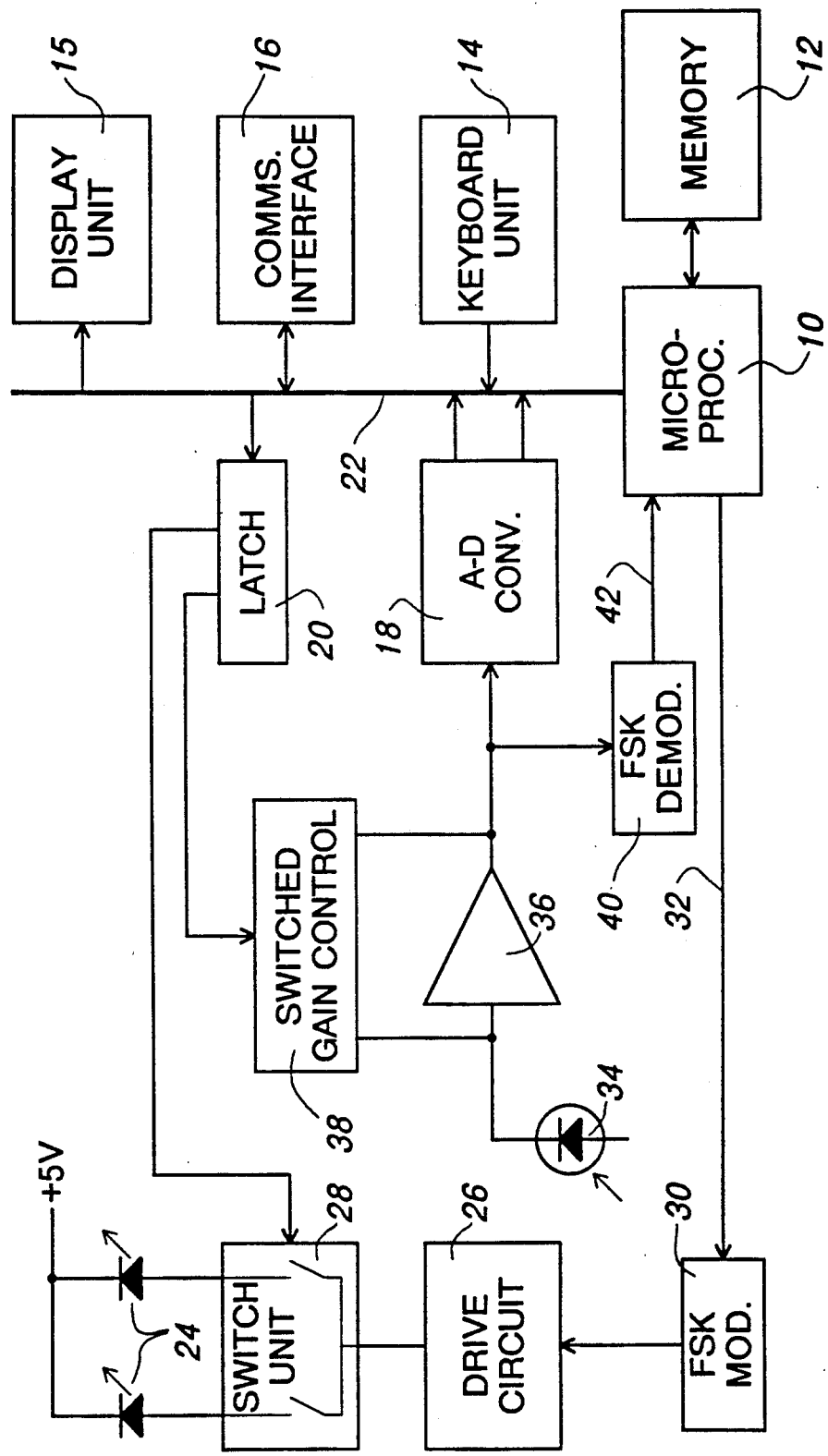

MEASUREMENT OF ATTENUATION OF OPTICAL FIBERS USING TRANSMITTED WAVELENGTH AND POWER INFORMATION

This invention relates to the measurement of attenuation of optical fibers in an optical communications system, and is particularly concerned with a method of and apparatus for facilitating attenuation measurements at different optical signal wavelengths.

BACKGROUND OF THE INVENTION

With increasing use of optical communications systems, it has become increasingly important to provide for appropriate testing of optical fibers in fiber cables of such systems. A fiber cable of an optical communications system may comprise a large number of, for example 48, individual optical fibers, and may extend over a large distance of many kilometers between its ends. It is desirable to be able to measure characteristics of many kilometers between its ends. It is desirable to be able to measure characteristics of each fiber in such a cable, in particular the attenuation of optical signals at two or more different optical signal wavelengths, such as 1300 and 1550 nm, which are typically used in optical communications systems. The attenuation measurements can desirably include measurement of attenuation of optical signals in each direction at each wavelength on each fiber, and total return loss of an optical fiber path which may also include optical fiber connectors and splices which give rise to increased losses.

In order to carry out such measurements, it is known to provide two test units which are employed, one at each end of a fiber cable, to test the fibers by transmitting an optical signal via each fiber between the units, in each case determining the optical signal attenuation at the receiving end. Such an arrangement requires that the units be calibrated with respect to one another. For such calibration, typically the units are brought together and optically coupled via a jumper, and the receiving unit stores for each wavelength a reference power level of the received optical signal, which stored reference is used for determining attenuation during subsequent testing. However, this has disadvantages in that the jumper must then remain connected for accurate testing, making it difficult to test fibers with different connectors, and there is a risk of the stored references being erased through operator error. In consequence, recalibration is frequently necessary, requiring that the units again be brought together as described above.

In Higginbotham et al. U.S. Pat. No. 4,234,253 issued Nov. 18, 1980 and entitled "Attenuation Measuring System" there is described a fiber optic attenuation measuring arrangement in which a feedback loop is used in a transmitter to maintain a constant output power level of a transmitted optical signal, which includes a test signal together with a higher-amplitude timing pulse. At a receiver, the timing pulse is separated and used to demoduate the test signal, which is compared with a reference signal to determine attenuation of a fiber under test. This reference is not concerned with measuring attenuation at different optical signal wavelengths.

In Heckmann U.S. Pat. No. 4,673,291 issued Jun. 16, 1987 and entitled "Method Of And Device For Measuring The Attenuation In Optical Waveguides" there is described an optical attenuation measuring arrangement in which the light power of an optical signal input to a fiber is encoded on the signal using pulse frequency modulation, and this is demodulated at the receiver to be used in determining attenuation of the optical signal by the fiber. This reference also is not concerned with measuring attenuation at different optical signal wavelengths.

In Maslaney et al. U.S. Pat. No. 4,726,676 issued Feb. 23, 1988 and entitled "Optical Signal Power Measurement Method And Apparatus" there is described an optical attenuation measuring arrangement in which optical test signals of different wavelengths are modulated with respective AC signals to identify the respective wavelengths to a receiver. A comparison value, which takes into account the wavelength-dependent sensitivity of a detector of the receiver, is stored in the receiver for each optical signal wavelength and is used with a received optical signal power level to determine attenuation of the optical signal transmitted via an optical fiber. This arrangement assumes a constant power level of the transmitted optical signal, and requires as many different modulating AC signal frequencies as there are optical signal wavelengths.

While these known arrangements provide various improvements over the testing arrangement initially described above, there remains a need to facilitate attenuation measurement of optical fibers at different wavelengths in a manner which is convenient and is not prone to operator error.

An object of this invention, therefore, is to provide an improved method of and measuring attenuation of an optical fiber, and improved apparatus for use in carrying out this method.

SUMMARY OF THE INVENTION

According to one aspect of this invention there is provided a method of measuring attenuation of an optical fiber, comprising the steps of: at a transmitter: transmitting an optical signal having a predetermined wavelength to the fiber; and modulating the optical signal with information identifying the wavelength and a transmitted power of the optical signal; and, at a receiver: detecting the optical signal received from the fiber; demodulating the detected optical signal to recover the wavelength and transmitted power information; reading stored wavelength-dependent detection sensitivity information in dependence upon the recovered wavelength information; monitoring a received power level of the optical signal; and determining attenuation of the optical fiber at the predetermined wavelength from the recovered transmitted power information, the monitored received power level, and the detection sensitivity information.

Preferably the steps of monitoring a received power level of the optical signal and determining attenuation of the optical fiber comprise the step of amplifying the detected optical signal with a gain dependent upon the detection sensitivity information to produce a wavelength-independent received power level signal. The step of monitoring the received power level of the optical signal preferably comprises the step of converting the wavelength-independent received power level signal to a digital value.

The optical signal is preferably transmitted as a continuous wave signal following the modulation with said information, and the monitoring step preferably comprises monitoring a received power level of the continuous wave signal. This ensures that the modulation of the optical signal with information does not adversely affect the monitoring and hence the determination of the attenuation of the optical fiber, regardless of the particular type of modulation which is used.

According to another aspect this invention provides apparatus for use in measuring attenuation of an optical fiber, comprising: a plurality of optical sources; means for selecting one of the optical sources for supplying an optical signal having a predetermined wavelength; means for modulating the optical signal with information identifying the wavelength and a transmitted power of the optical signal; a detector for detecting an optical signal received from an optical fiber; a store for storing wavelength-dependent sensitivity information for the detector; means for demodulating a detected optical signal to recover information identifying the wavelength and a transmitted power of the optical signal; means responsive to the recovered wavelength information for reading sensitivity information from the store; and means for determining attenuation of the optical fiber at the predetermined wavelength from the recovered transmitted power information, a received power level of the detected optical signal, and the sensitivity information.

Conveniently the optical sources comprise a plurality of laser diodes having different emission wavelengths, and the means for modulating and demodulating comprise an FSK modulator and demodulator.

The means for determining attenuation of the optical fiber at the predetermined wavelength preferably comprises means for amplifying the detected optical signal with a gain dependent upon the sensitivity information read from the store to produce a wavelength-independent received power level signal, and means for converting the wavelength-independent received power level signal to a digital value. The variable gain amplification ensures that the signal to be converted to a digital value has a range matched to the range of an A-D converter used for the digital conversion.

The apparatus preferably includes latch means for latching said sensitivity information read from the store and information for selecting said one of the optical sources.

BRIEF DESCRIPTION OF THE DRAWING

The invention will be further understood from the following description with reference to the accompanying drawing, which is a block diagram illustrating apparatus in accordance with the invention for use in measuring the attenuation of an optical fiber.

DESCRIPTION OF THE PREFERRED EMBODIMENT

The apparatus illustrated in the drawing comprises a microprocessor 10, an associated memory 12 coupled thereto, and a keyboard unit 14, a display unit 15, a communications interface 16, an A-D (analog-to-digital) converter 18, and an 8-bit latch 20 coupled in known manner to the microprocessor 10 via an 8-bit data bus 22. The A-D converter 18 is a 16-bit converter whose most-significant and least-significant byte outputs are separately connected to the bus 22 for supplying these bytes sequentially in operation. The keyboard unit 14 comprises a keyboard and decoder for supplying manually entered information to the microprocessor 10, and the display unit 15 is arranged for displaying information in known manner. The communication interface 16 comprises a UART (Universal Asynchronous Receiver and Transmitter) and RS-232 interface for establishing communications between the microprocessor 10 and a computer (not shown) for exchange of control information and data therebetween in known manner.

The apparatus further comprises a plurality of laser diodes or LEDs (light emitting diodes) 24 having different emission wavelengths at which testing of the attenuation of an optical fiber (not shown) is to be carried out. The drawing illustrates two laser diodes 24 which may for example emit light at respective wavelengths of 1300 and 1550 nm for testing an optical fiber at these wavelengths, but there may be a different number of diodes 24 and these may have other emission wavelengths. A drive circuit 26, which also includes laser diode temperature compensation and feedback control circuitry of known form, can be selectively coupled to any of the laser diodes 24 via a switch unit 28, the switches of which are controlled by certain bit positions of the latch 20. An optical signal emitted by the selected one of the laser diodes 24 can be modulated with an FSK (frequency shift keyed) modulating signal supplied by an FSK modulator 30 to the drive circuit 26, in accordance with information supplied to the modulator 30 from a transmit port of the microprocessor 10 via a line 32.

A photo-detector 34 can be coupled to an optical fiber (not shown) under test to receive an optical signal therefrom. The output of the detector 34 is amplified by an amplifier 36 whose gain is determined by a switched gain control circuit 38 which is controlled by other bit positions of the latch 20. For example, the amplifier 36 can comprise two amplification stages in succession, and the circuit 38 can comprise a plurality of resistors and associated switches, controlled from the latch 20, for selectively connecting the resistors in the feedback paths of the amplifiers thereby to determine the gains of the amplifiers.

The output of the amplifier 36 is coupled to an analog input of the A-D converter 18, and to an input of an FSK demodulator 40 whose output is connected to a receive port of the microprocessor 10 via a line 42. In this manner FSK information carried by an optical signal received by the detector 34 can be communicated to the microprocessor 10 via the demodulator 40. In addition, information relating to the amplitude or power level of the received optical signal can be communicated to the microprocessor 10 in digital form via the A-D converter 18 and the data bus 22.

The memory 12 conveniently comprises electrically erasable PROMs (programmable read-only memories) having sufficient capacity (for example 6 Kilobytes) to store calibration values, reference levels, and data acquired in operation of the apparatus. In particular, the memory 12 stores information relating to the sensitivity of the detector 34 to optical signals of different wavelengths, which information is used as described below for setting the switched gain control circuit 38 so that the gain of the amplifier 36 compensates for the wavelength-dependent nature of the detector 34. In this manner the output signal of the amplifier 36 is made independent of the optical signal wavelength and is matched to the conversion range of the A-D converter 18.

For measuring attenuation of an optical fiber, apparatus as illustrated in the drawing is provided at each end of the fiber. The fiber ends may, as previously indicated, be a great distance apart from one another. Although for each direction of transmission of an optical signal via the fiber an optical source is required at only one end of the fiber, with a detector at the other end, generally it is desirable to be able to carry out bidirectional testing, for which the entire apparatus shown in the drawing is provided at each end of the fiber. For clarity and convenience, in the following description the apparatus at one end of the fiber is referred to as "unit A" and the apparatus at the other end of the fiber is referred to as "unit B".

Initially, in each of the units A and B, transmitted optical signal power levels are produced for each testing wavelength and are stored in the memory 12. To this end, individually for each unit an optical fiber jumper is used to connect a selected one of the laser diodes 24 to the detector 34 of the same unit, and the microprocessor 10 is instructed, via the keyboard unit 14 or the communications interface 16, to load the latch 20 with information from the memory 12 for the respective wavelength. As should be appreciated from the preceding description, this information comprises control bits for setting the switch unit 28 to connect the drive circuit 26 to the respective laser diode 24 for the selected wavelength, and control bits for setting the switched gain control circuit 38 to the appropriate gain for this optical signal wavelength in accordance with the wavelength-dependent sensitivity of the detector 34.

A continuous wave optical signal (i.e. no FSK modulation by the modulator 30) is then transmitted from the selected laser diode 24 and received at the detector 34, the resulting signal level at the output of the amplifier 36 being converted into a 2-byte digital value by the A-D converter 18 and this digital value being stored as a transmitted power reference level for this wavelength in the store 12, under the control of the microprocessor 10. This process is repeated for each testing wavelength and in each unit. In subsequent testing, the optical fiber jumper is used for connection of each laser diode 24 to the fiber to be tested, to avoid introducing any testing errors. If a different jumper must be used, for example to accommodate different fiber connectors, then this initial storage of transmitted power reference levels can be easily repeated using the different jumper.

For measuring the attenuation of an optical fiber at each selected wavelength, the fiber is connected at one end via the respective jumper to the selected laser diode 24 in unit A, and is connected at the other end to the detector 34 of unit B. On being instructed via the keyboard 14 or communications interface 16, the microprocessor 10 in unit A controls its switch unit 28 to connect the selected laser diode 24 to the drive circuit 26, and supplies an identification of the respective wavelength via the line 32 to the FSK modulator 30 to be modulated on the optical signal transmitted to the fiber. In unit B at the other end of the fiber, this wavelength identity modulated on the optical signal is demodulated by the FSK demodulator 40 and is supplied via the line 42 to the microprocessor 10. The microprocessor 10 in unit B uses this wavelength identity to read from its memory 12 the appropriate information for setting the switched gain control circuit 38 for this wavelength, and loads its latch 20 accordingly.

The microprocessor 10 in unit A also supplies to its FSK modulator 30 the transmitted power reference level for the selected wavelength, which it reads from the store 12. This information is also transmitted via the fiber being tested to the unit B, where it is demodulated by the FSK demodulator 40 and supplied to the microprocessor 10 in unit B.

The microprocessor 10 in unit A then causes the selected laser diode 24 to transmit a continuous wave (no FSK modulation) optical signal to the fiber being tested, for a predetermined period of for example a few seconds. During this period, in unit B the resulting signal level at the output of the amplifier 36 is converted into a digital value by the A-D converter 18 and is supplied to the microprocessor 10 via the data bus 22. The microprocessor 10 in unit B then determines the fiber attenuation from this digital value in comparison to the previously received transmitted power reference level. The determined attenuation, and other information such as the wavelength, transmitted power reference level, and received signal level are displayed by the display unit 15 of unit B, and/or stored in its memory 12 and/or communicated via its communications interface 16.

The above steps of FSK transmission of the selected wavelength, set-up of the switched gain control circuit in the receiving unit B, FSK transmission of the respective transmitted power reference level, and continuous wave transmission of an optical signal with determination of the fiber attenuation, are repeated for each selected wavelength for which the fiber attenuation is to be measured, and are similarly repeated for other fibers in the same optical fiber cable. It should be noted that the initial step of storing transmitted power reference levels, and the monitoring to determine the fiber attenuation at each wavelength, are both carried out using continuous wave optical signals, so that errors due to the effects of modulating signals are avoided.

Similar procedures can be followed for attenuation measurement for the opposite direction of transmission of optical signals.

It should be appreciated that the apparatus as described above additionally provides, through the FSK modulator and demodulator in each unit, a general purpose communications channel, either in one direction at a time, from the unit A to the unit B as described above, or simultaneously in both directions between the units A and B using two selected fibers, one for each transmission direction. Such a channel can be used for transmitting other desired information, such as text, error messages, control instructions, etc., and also can be used at the end of a measurement operation to communicate test results between the two units.

In an embodiment of the invention, the FSK modulation was arranged to use shift frequencies of 1 and 2 kHz to represent binary values, with a transmission rate of 150 baud using 1 start bit, 8 data bits, and 1 stop bit. ASCII codes were used to specify the wavelength information, and code characters used for transmission of error codes. Each unit had either two or three optical sources 24 for attenuation measurement at two or three different wavelengths, any one (or none) of which was determined by two bit positions of the latch 20, the remaining six bit positions of the latch being available for controlling the switched gain control circuit.

Although a particular embodiment of the invention has been described in detail, it should be appreciated that numerous modifications, variations, and adaptations may be made to thereto without departing from the scope of the invention as defined in the claims.

What is claimed is:

1. A method of measuring attenuation of an optical fiber, comprising the steps of: at a transmitter:
    transmitting an optical signal having a predetermined wavelength to the fiber; and modulating the optical signal with information identifying the wavelength and a transmitted power of the optical signal; and, at a receiver:

detecting the optical signal received from the fiber;

demodulating the detected optical signal to recover the wavelength and transmitted power information;

reading stored wavelength-dependent detection sensitivity information in dependence upon the recovered wavelength information;

monitoring a received power level of the optical signal; and determining attenuation of the optical fiber at the predetermined wavelength from the recovered transmitted power information, the monitored received power level, and the detection sensitivity information, wherein the optical signal is transmitted as a continuous wave signal following the modulation with said information, and the monitoring step comprises monitoring a received power level of the continuous wave signal.

2. A method as defined in claim 1, wherein the steps of monitoring a received power level of the optical signal and determining attenuation of the optical fiber comprise the step of amplifying the detected optical signal with a gain dependent upon the detection sensitivity information to produce a wavelength-independent received power level signal.

3. A method as defined in claim 2, wherein the step of monitoring the received power level of the optical signal comprises the step of converting the wavelength-independent received power level signal to a digital value.

4. A method a defined in claim 3, wherein the transmitted power information comprises a digital signal.

5. A method as defined in claim 4, wherein the step of modulating comprises FSK modulation.

6. A method as defined in claim 1, wherein the step of modulating comprises FSK modulation.

* * * * *